United States Patent
Goksu et al.

(10) Patent No.: US 11,010,286 B1
(45) Date of Patent: May 18, 2021

(54) SOFTWARE TESTING WITH MACHINE LEARNING MODELS

(71) Applicant: INTERNATIONAL BUSINESS MACHINES CORPORATION, Armonk, NY (US)

(72) Inventors: Mehmet Cuneyt Goksu, Schönaich (DE); Freddy Lorge, Vedrin (BE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/793,365

(22) Filed: Feb. 18, 2020

(51) Int. Cl.
G06F 9/44 (2018.01)
G06F 11/36 (2006.01)
G06N 20/00 (2019.01)

(52) U.S. Cl.
CPC ...... G06F 11/3688 (2013.01); G06F 11/3664 (2013.01); G06N 20/00 (2019.01)

(58) Field of Classification Search
CPC ............ G06F 11/3688; G06F 11/3692; G06F 11/3664; G06F 11/3668; G06F 11/3672; G06F 11/3696
USPC ................................................ 717/124, 127
See application file for complete search history.

(56) References Cited

U.S. PATENT DOCUMENTS

| | | | |
|---|---|---|---|
| 10,802,477 B1 * | 10/2020 | Konrardy | B60W 10/20 |
| 2006/0247852 A1 | 11/2006 | Kortge | |
| 2008/0082968 A1 * | 4/2008 | Chang | G06F 11/3688 717/128 |
| 2017/0357807 A1 * | 12/2017 | Harms | G06F 21/568 |
| 2018/0107920 A1 | 4/2018 | Jayaraman | |
| 2018/0285567 A1 * | 10/2018 | Raman | G06F 21/53 |
| 2019/0065181 A1 * | 2/2019 | Hsiung | G06F 8/76 |
| 2019/0102695 A1 * | 4/2019 | Biswas | G06F 13/102 |
| 2019/0121722 A1 | 4/2019 | Kuruma | |
| 2019/0171553 A1 | 6/2019 | Chauhan | |
| 2019/0303623 A1 * | 10/2019 | Reddy | G06F 11/3692 |
| 2019/0384699 A1 * | 12/2019 | Arbon | G06N 3/006 |
| 2020/0117577 A1 * | 4/2020 | Saxena | G06F 11/3664 |
| 2020/0167001 A1 * | 5/2020 | Trim | G01S 15/62 |
| 2020/0310948 A1 * | 10/2020 | Culibrk | G06N 20/00 |

OTHER PUBLICATIONS

Title: An approach to software testing of machine learning applications author: C Murphy Published on 2007.*

(Continued)

*Primary Examiner* — Chameli Das
(74) *Attorney, Agent, or Firm* — Schmeiser, Olsen & Watts; Aaron Pontikos

(57) ABSTRACT

A method, system, and program product for testing adaptive software is provided. The method includes receiving a selection for a software testing model associated with a portion of a software product requiring operational testing. The software testing model is selected from a database of saturated models. Input data for executing the software testing model is received and loaded within a model execution module. The software testing model is executed with respect to the input data and an output verifying results is generated. Input values associated with operational issues of the software product are stored. Machine learning software code is generated. The machine learning software code is configured for executing future processes associated with generating and selecting additional input values for future executions of the software testing model.

18 Claims, 8 Drawing Sheets

(56) References Cited

OTHER PUBLICATIONS

Title: Novel applications of machine learning in software testing author: LC Briand Published on 2008.*
A scenario-based reliability analysis approach for component-based software, author: S Yacoub published on 2004.*
DART: directed automated random testing author: P Godefroid, published on 2005.*
Badri, Mourad et al.; Investigating the Accuracy of Test Code Size Prediction using Use Case Metrics and Machine Learning Algorithms: An Empirical Study; Proceedings of the 2017 International Conference on Machine Learning and Soft Computing; Jan. 2017 •pp. 25-33.

\* cited by examiner

SOFTWARE TESTING WITH MACHINE LEARNING MODELS

BACKGROUND

The present invention relates generally to a method for testing software and in particular to a method and associated system for improving software technology associated with executing a software testing model associated with a portion of a software product requiring operational testing and generating associated machine learning software code.

SUMMARY

A first aspect of the invention provides an adaptive software testing method comprising: receiving, by a processor of a hardware device from a user via a graphical user interface (GUI), a selection for a software testing model for execution, wherein the software testing model is selected from a database of saturated models, and wherein the software testing model is associated with a portion of a software product requiring operational testing; receiving, by the processor from a user via the GUI, input data for executing the software testing model; loading, by the processor, the input data and the software testing model within a model execution module of the hardware device; running, by the processor executing the model execution module, the software testing model with respect to the input data; generating, by the processor, an output verifying results of the running based on results of the running the software testing model with respect to the input data; storing, by the processor within a specialized database, input values of the input data associated with operational issues of the software product; and generating, by the processor, machine learning software code for executing future processes associated with generating and selecting additional input values for future executions of the software testing model.

A second aspect of the invention provides a computer program product, comprising a computer readable hardware storage device storing a computer readable program code, the computer readable program code comprising an algorithm that when executed by a processor of a hardware device implements an adaptive software testing method, the method comprising: receiving, by the processor from a user via a graphical user interface (GUI), a selection for a software testing model for execution, wherein the software testing model is selected from a database of saturated models, and wherein the software testing model is associated with a portion of a software product requiring operational testing; receiving, by the processor from a user via the GUI, input data for executing the software testing model; loading, by the processor, the input data and the software testing model within a model execution module of the hardware device; running, by the processor executing the model execution module, the software testing model with respect to the input data; generating, by the processor, an output verifying results of the running based on results of the running the software testing model with respect to the input data; storing, by the processor within a specialized database, input values of the input data associated with operational issues of the software product; and generating, by the processor, machine learning software code for executing future processes associated with generating and selecting additional input values for future executions of the software testing model.

A third aspect of the invention provides a hardware device comprising a processor coupled to a computer-readable memory unit, the memory unit comprising instructions that when executed by the processor implements an adaptive software testing method comprising: receiving, by the processor from a user via a graphical user interface (GUI), a selection for a software testing model for execution, wherein the software testing model is selected from a database of saturated models, and wherein the software testing model is associated with a portion of a software product requiring operational testing; receiving, by the processor from a user via the GUI, input data for executing the software testing model; loading, by the processor, the input data and the software testing model within a model execution module of the hardware device; running, by the processor executing the model execution module, the software testing model with respect to the input data; generating, by the processor, an output verifying results of the running based on results of the running the software testing model with respect to the input data; storing, by the processor within a specialized database, input values of the input data associated with operational issues of the software product; and generating, by the processor, machine learning software code for executing future processes associated with generating and selecting additional input values for future executions of the software testing model.

The present invention advantageously provides a simple method and associated system capable of accurately testing software.

DETAILED DESCRIPTION

Figure 1:
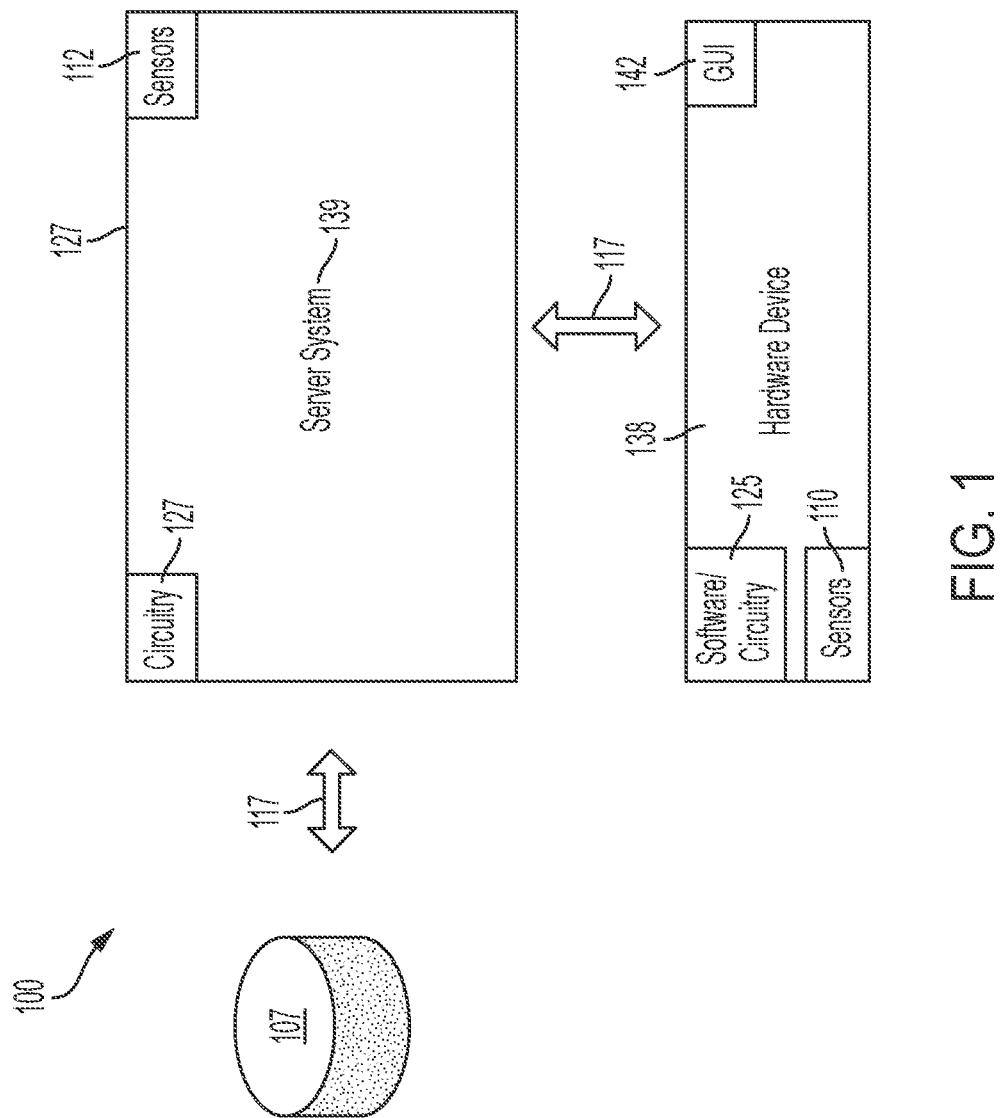
FIG. 1 illustrates a system for improving software technology associated with executing a software testing model associated with a portion of a software product requiring operational testing and generating associated machine learning software code, in accordance with embodiments of the present invention.

FIG. 1 illustrates a system 100 for improving software technology associated with executing a software testing model associated with a portion of a software product requiring operational testing and generating associated machine learning software code, in accordance with embodiments of the present invention. System 100 addresses issues associated with a typical process for functionally testing software products with respect to different use case scenarios. For example, extended timeframes and effort may be necessary for testing software products thereby increasing cost factors and market implementation and allowing competitors introduce competing products first. Likewise, software products are typically tested with respect to a limited timeframe and limited functionalities. Typical software testing scenarios are associated with limited differing values of input variables thereby restricting a number of testing options such that the software products may eventually malfunction during production or integration with additional products and solutions due to the software products not being fully tested. Therefore, system 100 is configured to address the aforementioned technical issues as follows:

1. Testing data generation scenarios for diverse functionalities and validation with respect to test input.
2. Locating and differentiating an enhanced combination of data to generate correct and incorrect output associated with a possible computer code repair process.
3. A software product's functions are executed with provided values for each new test for a specific implementation scenario.
4. Retaining a multi-platform setup for a software product for an extended timeframe.

System 100 enables a machine learning (ML) based testing platform associated with executing predefined test scenarios with supported machine learning models (comprising training capability) generated in advance. The test scenarios are applied to the testing platform via application programming interfaces (APIs) with respect to differing levels of operational functional tests. A solution generated via execution of the test scenarios produces differing input values for testing and executing different scenarios. Each scenario corresponding to one or more functions of the software product is mapped to an ML Model. Each ML model is trained with respect to the variables of an associated scenario in advance. Likewise, each ML model is configured to generate a score illustrating if an associated test was successful. Subsequent test result outputs are used to train the ML model for a better test related outcome. A resulting solution enables the ML model to self-learn thereby remembering results of previous testing executions and generating differing input values for a next iteration of a testing scenario.

System 100 is configured to improve and accelerate a quality of test processes of a software product comprising different operational capabilities by providing an infinite number of testing opportunities with respect to a same testing scenario. Likewise, resulting outputs of a testing scenario generating a negative score associated with a specified probability is determined to be "bug" (i.e. a malfunction) and is passed to developer for further testing. A solution is associated with a trained model for a specific scenario that may simulate the software products' functionality and generate a true/false result for a provided input. The solution is configured to automate the testing process after a ML model reaches a saturation point. Therefore, the solution may be used by any scenario to test the software product without accessing the software product itself.

System 100 of FIG. 1 includes a server system 139 (i.e., specialized hardware device), a hardware device 138, and a database 107 (e.g., a cloud-based system) interconnected through a network 117. Server system 139 includes specialized circuitry 127 (that may include specialized software) and sensors 112. Hardware device 138 may include, inter alia, a smart phone, a tablet computer, a computing device, an embedded device, etc. Hardware device 138 includes specialized circuitry 125 (that may include specialized software including machine-learning software code), sensors 110, and a GUI 142. Sensors 110 and 112 may include any type of internal or external sensor (or biometric sensor) including, inter alia, ultrasonic three-dimensional sensor modules, an optical sensor, a video retrieval device, an audio retrieval device, humidity sensors, voltage sensors, a keyboard, a mouse, a touch screen, etc. Server system 139 and hardware device 138 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server system 139 and hardware device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-8. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software technology associated with executing a software testing model associated with a portion of a software product requiring operational testing and generating associated machine learning software code. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables a process for generating sets of input values for testing operational scenarios with respect to a developed software product and enabling the testing scenarios via ML models (associated with each scenario) without the software product being available for testing. Therefore, system 100 provides for a product-free testing system that may predict or otherwise determine whether a software test on a given input data will fail or succeed without requiring that the software actually be installed. System 100 is implemented in three phases:

1. A first training phase associated with machine learning training using labeled features as manual input for creating a first version of a ML (scenario) model.
2. A second training phase associated with automated, accelerated and continuous training via usage of automatically generated sets of values. The second training phase enables generated data to be validated by the ML model.
3. A product-free execution phase associated with the ML model being saturated (i.e., mature) such that associated tests may be continued by any entity role (e.g., end-users) within an organization without accessing the software product itself. The associated tests are enabled via an interface using the ML model. Likewise, an infrastructure hosting the software product on different platforms may be dismantled if necessary.

Figure 2:
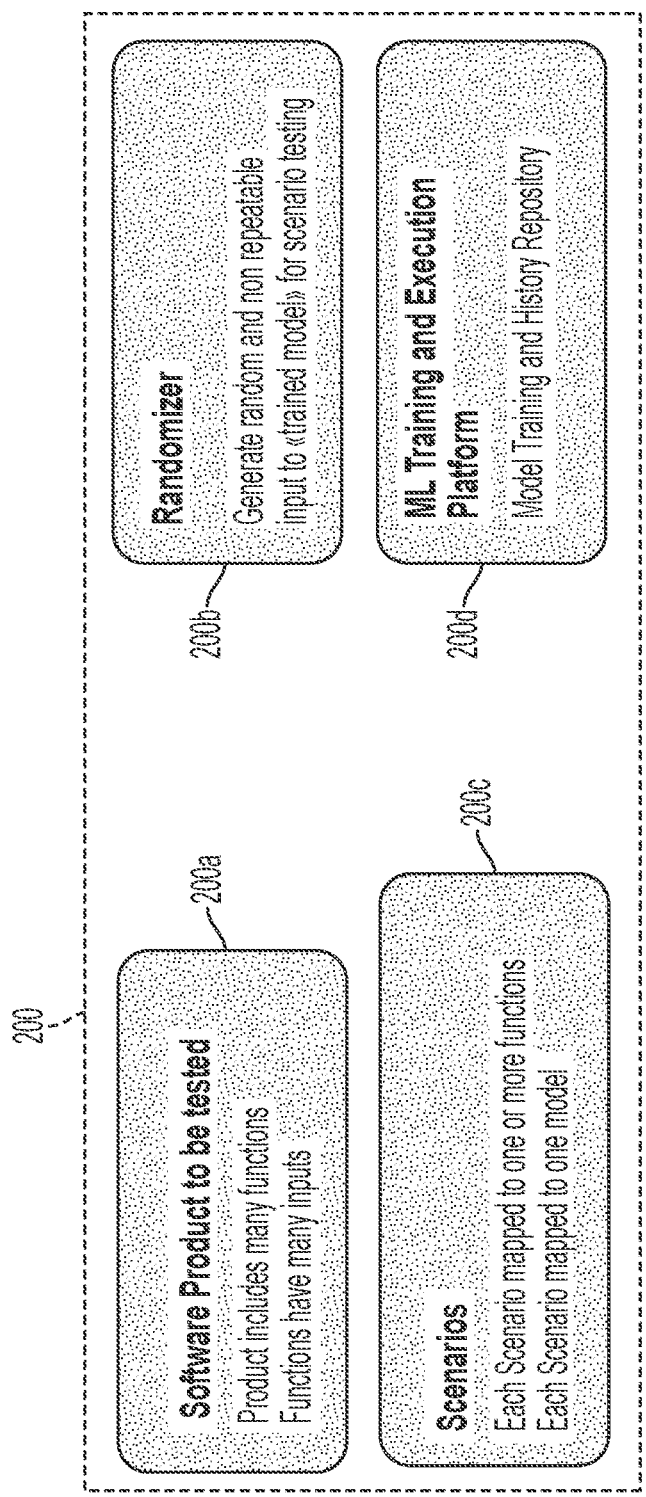
FIG. 2 illustrates an internal structural view of components of the system of FIG. 1, in accordance with embodiments of the present invention.

FIG. 2 illustrates an internal structural view of components 200 of system 100 of FIG. 1, in accordance with embodiments of the present invention. Components 200 include: a software product 200a to be tested, a randomizer component 200b, a scenario component 200c, and an ML training and execution platform component 200d. Software product 200a enables many functions each including multiple inputs. Randomizer component 200b is configured to generate random and non-repeatable input for a trained model for specified scenario testing. Scenario component 200c enables scenarios mapped to one or more functions. Each Scenario mapped to a single ML model. ML training and execution platform component 200d enables model training and a history repository. Each scenario includes multiple functions and each function includes multiple values. Likewise, each scenario is configured to receive multiple inputs depending on functions contained. Each scenario includes a single model and each model comprises multiple inputs corresponding to a specified scenario. The models are trained in advance of any processing and each model is configured to generate a score (e.g., true/false) based on the provided values.

Figure 3:
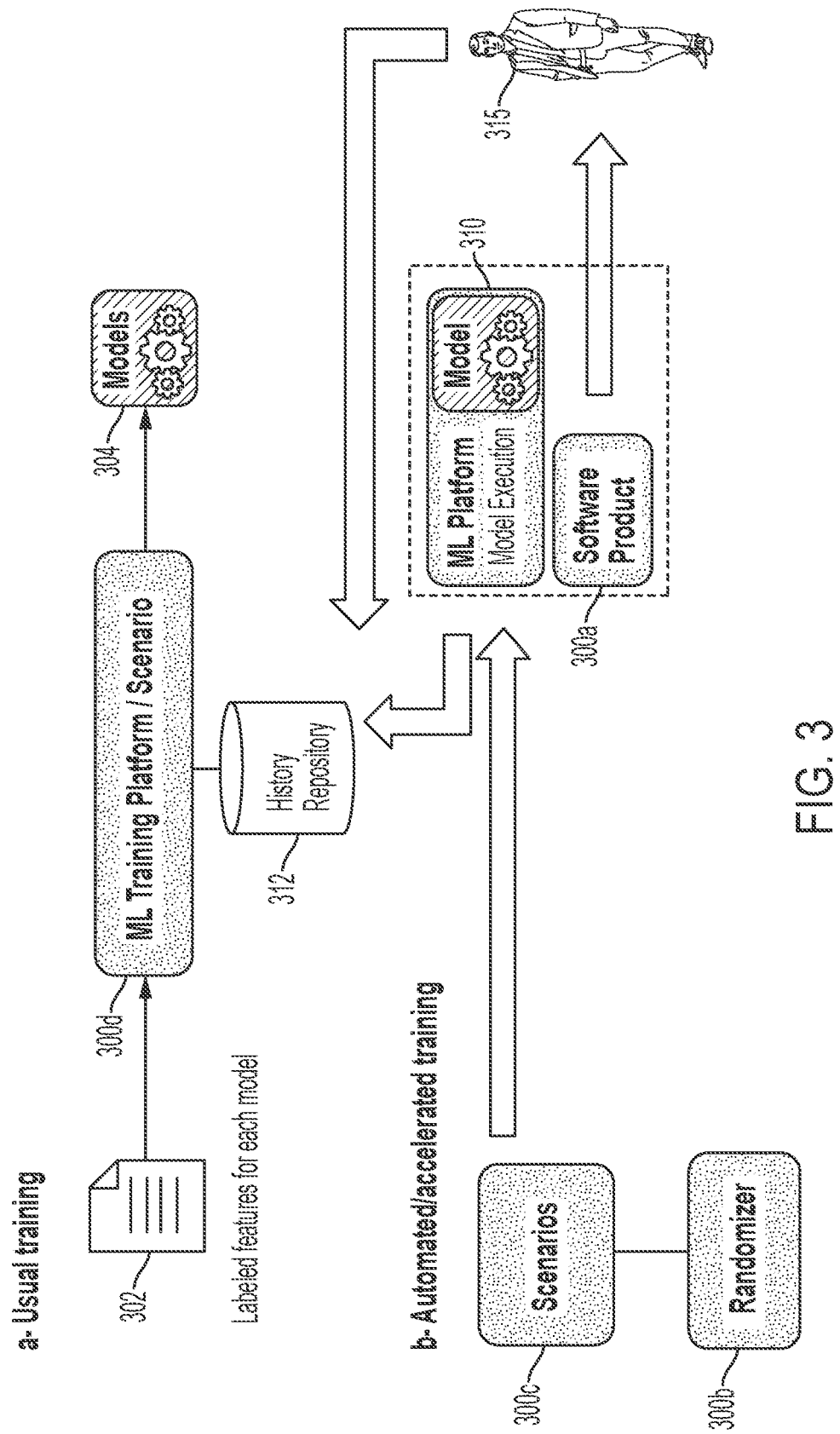
FIG. 3 illustrates an internal process flow enabled by components of FIG. 2, in accordance with embodiments of the present invention.

FIG. 3 illustrates an internal process flow enabled by components of FIG. 2, in accordance with embodiments of the present invention. The process is initiated when labeled features 302 for each model (of models 304) are specified as function values for a specified scenario. The labeled features are configured for model training for the specified scenario. Each model retrieved from an ML training and execution platform component 300d is trained for deployment and execution. A randomizer component 300b provides random input values for a given scenario executed by a scenario component 300c. Scenario component 300c executes an associated model with associated values. Scenario component 300c additionally feeds (and monitors) a software model and a software product 300a. Likewise, each model executes and generates a score (e.g., True/False) with an associated probability. A true score indicates a successful test and a false score indicates an unsuccessful test. Software product 300a may additionally execute a specified scenario as well. Executed models may be restored to a repository 312 for a next training cycle. Additionally, a generated score with provided input is transmitted to a repository for further training and outputs generated by software product 300a are monitored by a developer 315. The outputs are labeled and transmitted back to repository 312. Therefore, a final and saturated model may be used to test a specified scenario without accessing software 300a product for future tests. A saturated model is defined herein as a result of iterations of running the aforementioned internal process of FIG. 3. Iterations are repeated until the model presents (when given) new input values, the same results as software product 300a with a sufficiently high score and for a sufficiently high number of cases.

Figure 4:
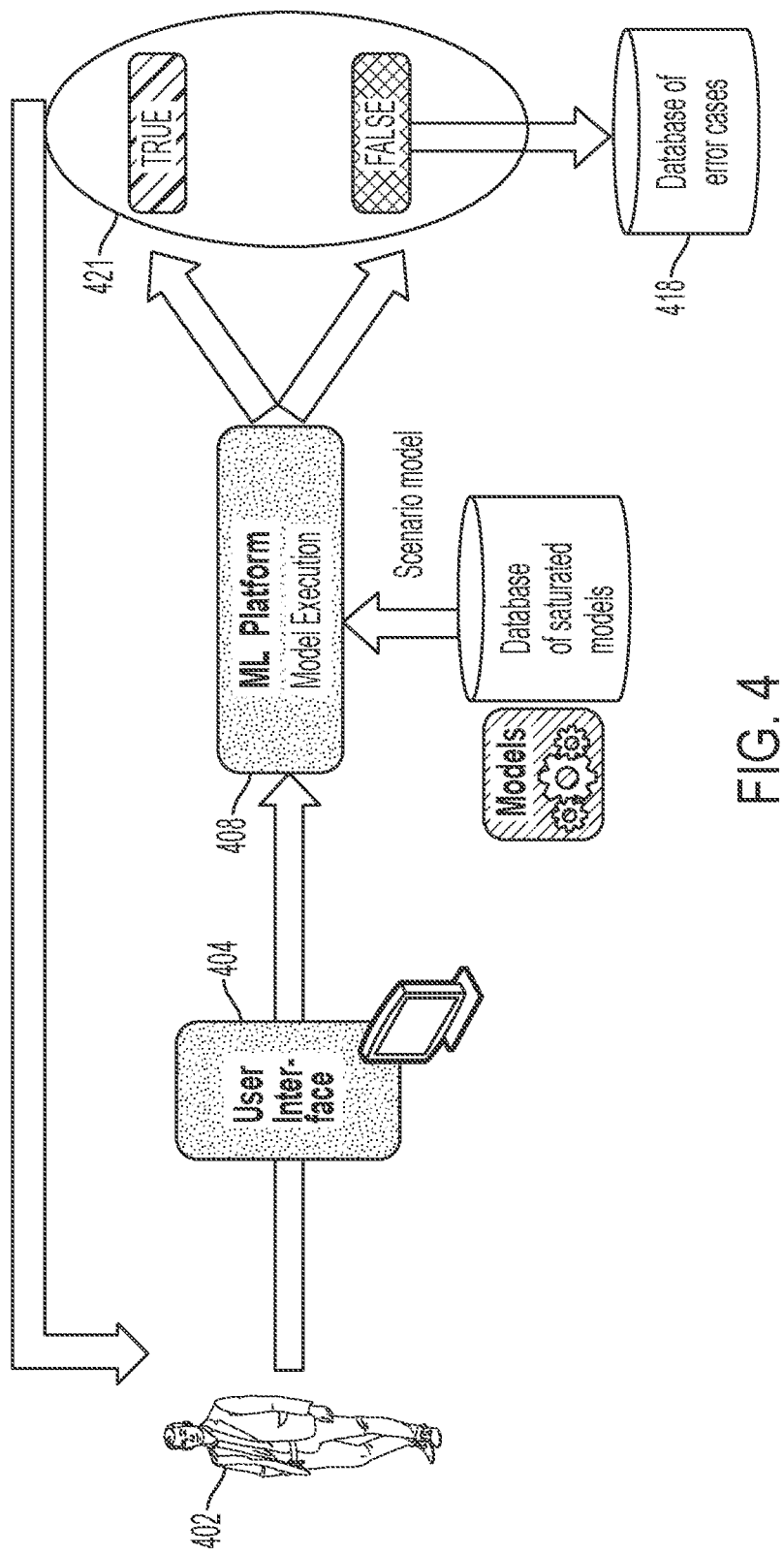
FIG. 4 illustrates an internal process flow for enabling software product-free execution, in accordance with embodiments of the present invention.

FIG. 4 illustrates an internal process flow for enabling software product-free execution, in accordance with embodiments of the present invention. Software product free execution is defined herein as a software product-free testing process for predicting and/or determining whether a software product function correctly without requiring that the software actually be installed. The process is initiated when an end-user 402 selects a specified testing scenario and provides input to for testing via an interface 404. The input is transmitted to a model execution platform 408. In response, model execution platform 408 loads a scenario based model and runs it with the received input. A resulting output 421 of the execution model is true (i.e., successful) or false (i.e., failure). An output indicating a false result is stored in a database 418 of bugs for enabling cases for debugging a software product 422 and creating a new software product version. All test results may be used to influence end-user 402 with respect to a choice of next input values or next a scenario for testing. Therefore, software product 422 is not required for enabling the testing process.

Figure 5:
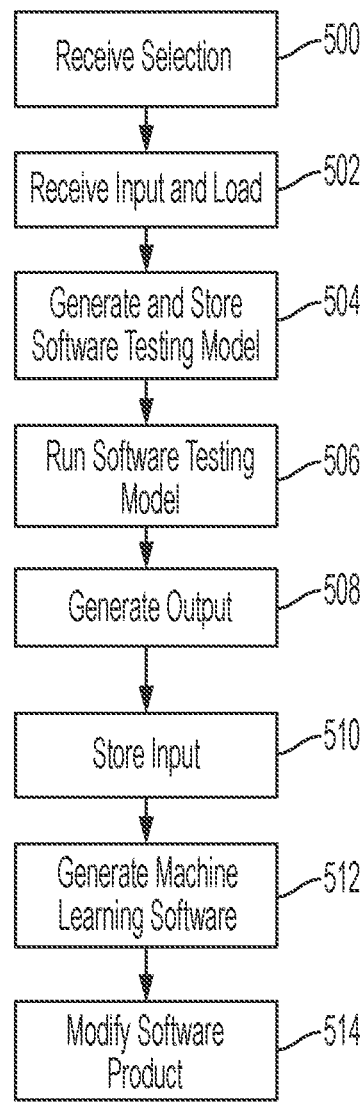
FIG. 5 illustrates an algorithm detailing a process flow enabled by the system of FIG. 1 for improving software technology associated with executing a software testing model associated with a portion of a software product requiring operational testing and generating associated machine learning software code, in accordance with embodiments of the present invention

FIG. 5 illustrates an algorithm detailing a process flow enabled by system 100 of FIG. 1 for improving software technology associated with executing a software testing model associated with a portion of a software product requiring operational testing and generating associated machine learning software code, in accordance with embodiments of the present invention. Each of the steps in the algorithm of FIG. 5 may be enabled and executed in any order by a computer processor(s) executing computer code. Additionally, each of the steps in the algorithm of FIG. 5 may be enabled and executed in combination by server system 139 and hardware device 138. In step 500, a selection for a software testing model for execution is received from a user via a graphical user interface (GUI). The software testing model is selected from a database of saturated models. The software testing model is associated with a portion of a software product requiring operational testing. In step 502, input data for executing the software testing model is received from a user via the GUI. Additionally, the input data and the software testing model are loaded within a model execution module of a hardware device. In step 504, a software testing model is generated and stored. The software testing model is generated via execution of the following process:

The process is initiated when function value definitions are received. The function value definitions are associated with model features of an initial software testing model associated with a specified scenario for testing software applications for operability. Subsequently, random input values associated with function value definitions are received from a randomizer module and the initial software testing model is executed with respect to the random input values and specified scenario. A resulting score associated with predicting results of running the software testing model with respect to the input data is generated and stored within a specialized database. Additionally, the portion of the software product is executed with respect to the specified scenario and an output associated with the execution is generated. The output is analyzed with respect to the initial software testing model, the random input values, and the specified scenario and a resulting software testing model is generated. The software testing model is stored within a database of saturated models.

In step 506, the software testing model is run (i.e., executed) with respect to the input data. In step 508, an output verifying results of running the software testing model with respect to the input data is verified. The results may indicate that the portion of the software product is fully functional or has operational issues.

In step 510, input values of the input data are stored within a specialized database. The input values are associated with operational issues of the software product. In step 512, machine learning software code is generated. The machine learning software code is configured for executing future processes associated with generating and selecting additional input values for future executions of the software testing model. In step 514, the software product is modified. The software product may be modified by debugging (by the user based on the results of step 508) the portion of the software product. Alternatively, software product may be modified by generating (based on the results of step 508) a new version of the portion of the software product.

Figure 6:
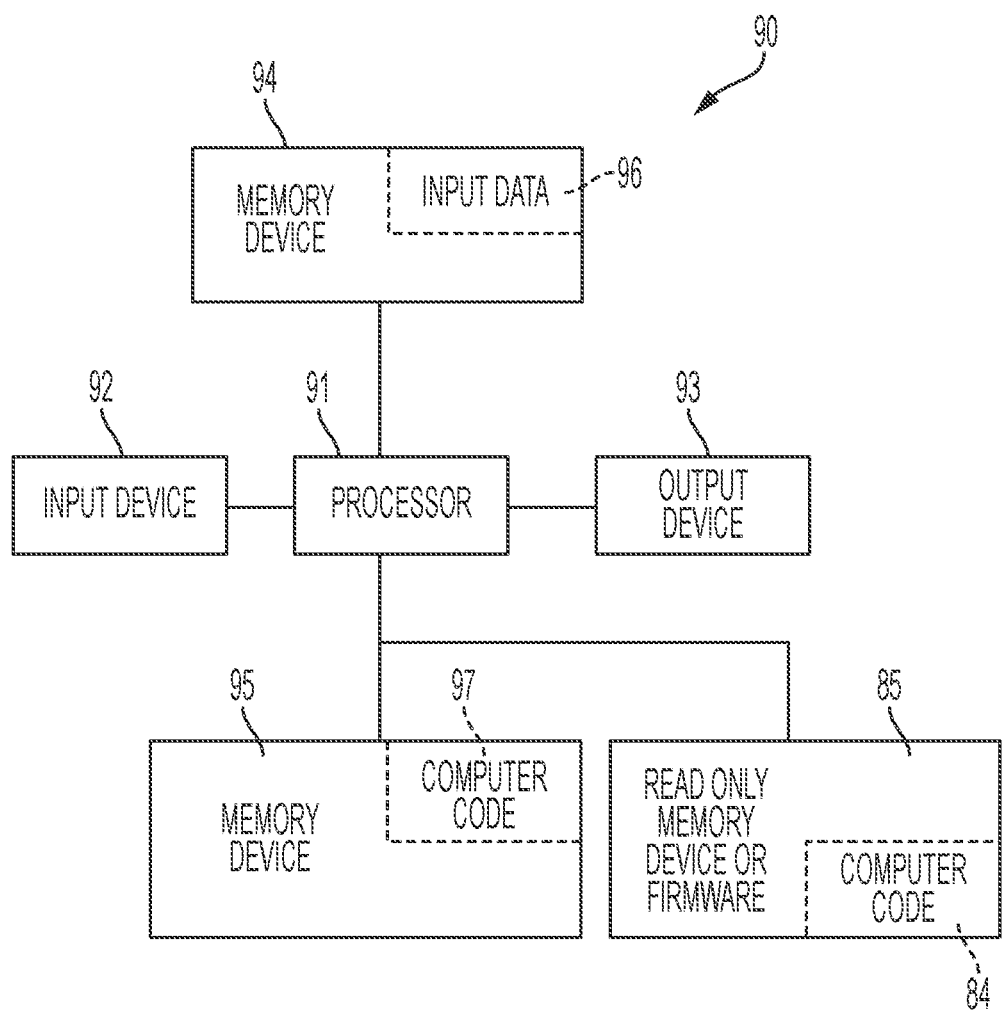
FIG. 6 illustrates a computer system used by the system of FIG. 1 for improving software technology associated with executing a software testing model associated with a portion of a software product requiring operational testing and generating associated machine learning software code, in accordance with embodiments of the present invention.

FIG. 6 illustrates a computer system 90 (e.g., server system 139 and/or hardware device 138 of FIG. 1) used by or comprised by the system of FIG. 1 for improving software technology associated with executing a software testing model associated with a portion of a software product requiring operational testing and generating associated machine learning software code, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 5) for improving software technology associated with executing a software testing model associated with a portion of a software product requiring operational testing and generating associated machine learning software code. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 5) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with executing a software testing model associated with a portion of a software product requiring operational testing and generating associated machine learning software code. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with executing a software testing model associated with a portion of a software product requiring operational testing and generating associated machine learning software code. In another embodiment, the invention provides a business method that performs the process steps of the invention on a subscription, advertising, and/or fee basis. That is, a service supplier, such as a Solution Integrator, could offer to enable a process for improving software technology associated with executing a software testing model associated with a portion of a software product requiring operational testing and generating associated machine learning software code. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a configuration of hardware and software, any configuration of hardware and software, as would be known to a person of ordinary skill in the art, may be utilized for the purposes stated supra in conjunction with the computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
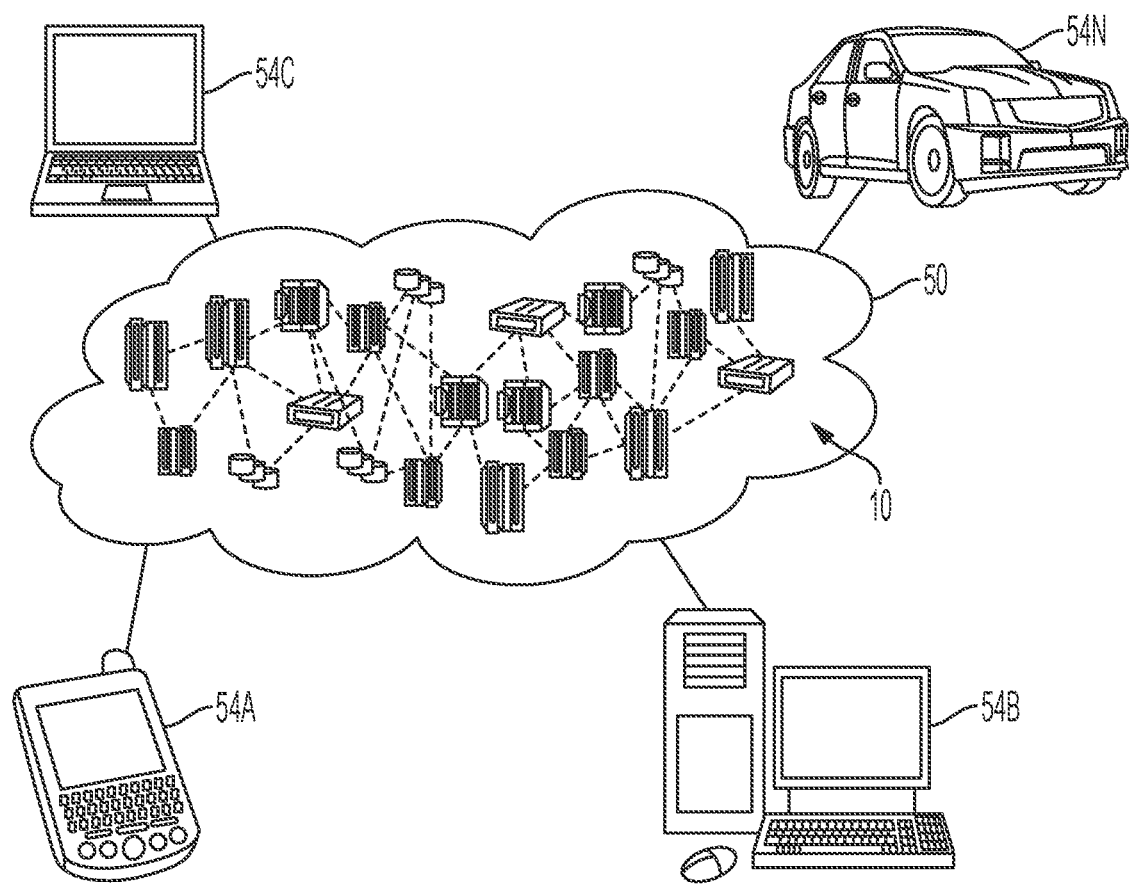
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
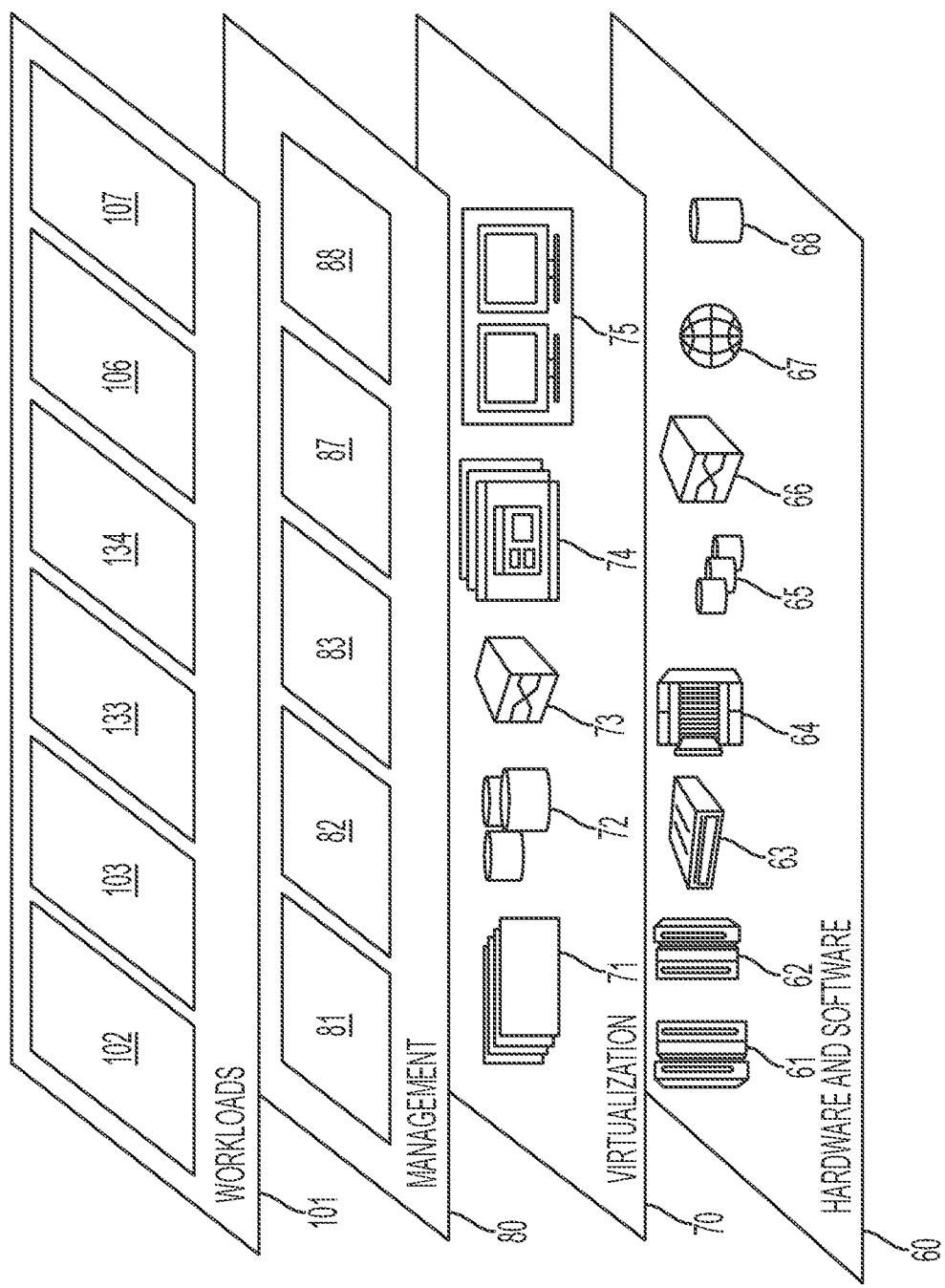
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software technology associated with executing a software testing model associated with a portion of a software product requiring operational testing and generating associated machine learning software code 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An adaptive software testing method comprising:
   receiving, by a processor of a hardware device, function values definitions associated with model features of an initial software testing model associated with a specified scenario for testing software applications for operability;
   receiving, by said processor from a randomizer module, random input values associated with said function values definitions;
   executing, by said processor, said initial software testing model with respect to said random input values and said specified scenario;
   generating, by said processor, a score associated with predicting results of running a software testing model with respect to input data;
   storing, by said processor within said specialized database, first results of said generating said score;
   executing, by said processor, a portion of a software product with respect to said specified scenario;
   generating, by said processor, an output associated with said executing said software product with respect to said specified scenario;
   analyzing, by said processor, said output with respect to said initial software testing model, said random input values, and said specified scenario;
   generating, by said processor based on second results of said analyzing, said software testing model;
   receiving, by said processor from a user via a graphical user interface (GUI), a selection for said software testing model for execution, wherein said software testing model is selected from a database of saturated models, and wherein said software testing model is associated with said portion of said software product requiring operational testing;
   receiving, by said processor from a user via said GUI, said input data for executing said software testing model;
   running, by said processor, said software testing model with respect to said input data;
   generating, by said processor, an output verifying results of said running based on results of said running said software testing model with respect to said input data;
   storing, by said processor within a specialized database, input values of said input data associated with operational issues of said software product; and
   generating, by said processor, machine learning software code for executing future processes associated with generating and selecting additional input values for future executions of said software testing model.

2. The method of claim 1, wherein said results indicate that said portion of said software product is fully functional.

3. The method of claim 1, wherein said results indicate that said portion of said software product comprises said operational issues.

4. The method of claim 3, further comprising:
   debugging, by said user via said processor based on said results, said portion of said software product.

5. The method of claim 3, further comprising:
   generating, by said user via said processor based on said results, a new version of said portion of said software product.

6. The method of claim 1, further comprising:
   storing, by said processor, said software testing model within said database of saturated models.

7. The method of claim 1, further comprising:
   providing at least one support service for at least one of creating, integrating, hosting, maintaining, and deploying computer-readable code in said hardware device, said code being executed by the computer processor to implement: said receiving said selection, said receiving said input data, said running, said generating said output, said storing, and said generating said machine learning software code.

8. A computer program product, comprising a computer readable hardware storage device storing a computer readable program code, said computer readable program code comprising an algorithm that when executed by a processor of a hardware device implements an adaptive software testing method, said method comprising:
   receiving, by said processor, function values definitions associated with model features of an initial software testing model associated with a specified scenario for testing software applications for operability;
   receiving, by said processor from a randomizer module, random input values associated with said function values definitions;
   executing, by said processor, said initial software testing model with respect to said random input values and said specified scenario;
   generating, by said processor, a score associated with predicting results of running a software testing model with respect to input data;
   storing, by said processor within said specialized database, first results of said generating said score;
   executing, by said processor, a portion of a software product with respect to said specified scenario;
   generating, by said processor, an output associated with said executing said software product with respect to said specified scenario;
   analyzing, by said processor, said output with respect to said initial software testing model, said random input values, and said specified scenario;
   generating, by said processor based on second results of said analyzing, said software testing model;
   receiving, by said processor from a user via a graphical user interface (GUI), a selection for said software testing model for execution, wherein said software testing model is selected from a database of saturated models, and wherein said software testing model is associated with said portion of said software product requiring operational testing;
   receiving, by said processor from a user via said GUI, said input data for executing said software testing model;
   running, by said processor, said software testing model with respect to said input data;
   generating, by said processor, an output verifying results of said running based on results of said running said software testing model with respect to said input data;
   storing, by said processor within a specialized database, input values of said input data associated with operational issues of said software product; and
   generating, by said processor, machine learning software code for executing future processes associated with generating and selecting additional input values for future executions of said software testing model.

9. The computer program product of claim 8, wherein said results indicate that said portion of said software product is fully functional.

10. The computer program product of claim 8, wherein said results indicate that said portion of said software product comprises said operational issues.

11. The computer program product of claim 10, wherein said method further comprises:
   debugging, by said user via said processor based on said results, said portion of said software product.

12. The computer program product of claim 10, wherein said method further comprises:
   generating, by said user via said processor based on said results, a new version of said portion of said software product.

13. The computer program product of claim 8, wherein said method further comprises:
   storing, by said processor, said software testing model within said database of saturated models.

14. A hardware device comprising a processor coupled to a computer-readable memory unit, said memory unit comprising instructions that when executed by the processor implements an adaptive software testing method comprising:
   receiving, by said processor, function values definitions associated with model features of an initial software testing model associated with a specified scenario for testing software applications for operability;
   receiving, by said processor from a randomizer module, random input values associated with said function values definitions;
   executing, by said processor, said initial software testing model with respect to said random input values and said specified scenario;
   generating, by said processor, a score associated with predicting results of running a software testing model with respect to input data;
   storing, by said processor within said specialized database, first results of said generating said score;
   executing, by said processor, a portion of a software product with respect to said specified scenario;
   generating, by said processor, an output associated with said executing said software product with respect to said specified scenario;
   analyzing, by said processor, said output with respect to said initial software testing model, said random input values, and said specified scenario;
   generating, by said processor based on second results of said analyzing, said software testing model;
   receiving, by said processor from a user via a graphical user interface (GUI), a selection for said software testing model for execution, wherein said software testing model is selected from a database of saturated models, and wherein said software testing model is associated with said portion of said software product requiring operational testing;
   receiving, by said processor from a user via said GUI, said input data for executing said software testing model;
   running, by said processor, said software testing model with respect to said input data;
   generating, by said processor, an output verifying results of said running based on results of said running said software testing model with respect to said input data;
   storing, by said processor within a specialized database, input values of said input data associated with operational issues of said software product; and
   generating, by said processor, machine learning software code for executing future processes associated with generating and selecting additional input values for future executions of said software testing model.

15. The hardware device of claim 14, wherein said results indicate that said portion of said software product is fully functional.

16. The hardware device of claim 14, wherein said results indicate that said portion of said software product comprises said operational issues.

17. The hardware device of claim 16, wherein said method further comprises:
   debugging, by said user via said processor based on said results, said portion of said software product.

18. The hardware device of claim 16, wherein said method further comprises:
   generating, by said user via said processor based on said results, a new version of said portion of said software product.

* * * * *